(12) United States Patent
Ojo

(10) Patent No.: US 12,477,066 B2
(45) Date of Patent: Nov. 18, 2025

(54) BEST TIME TO CALL IN AUTOMATIC DIALING OPERATIONS

(71) Applicant: Adedamola Ojo, Torrance, CA (US)

(72) Inventor: Adedamola Ojo, Torrance, CA (US)

( * ) Notice: Subject to any disclaimer, the term of this patent is extended or adjusted under 35 U.S.C. 154(b) by 383 days.

(21) Appl. No.: 17/983,203

(22) Filed: Nov. 8, 2022

(65) Prior Publication Data

US 2024/0155052 A1   May 9, 2024

(51) Int. Cl.
*H04M 3/00*    (2024.01)
*G06Q 40/12*   (2023.01)
*H04M 3/51*    (2006.01)
*H04M 5/00*    (2006.01)

(52) U.S. Cl.
CPC .......... *H04M 3/5158* (2013.01); *G06Q 40/12* (2013.12)

(58) Field of Classification Search
CPC .............................. H04M 3/5158; G06Q 40/12
See application file for complete search history.

(56) References Cited

U.S. PATENT DOCUMENTS

| | | | | |
|---|---|---|---|---|
| 9,723,144 | B1* | 8/2017 | Gao | H04M 3/5238 |
| 9,894,205 | B1* | 2/2018 | Miller | G06Q 10/04 |
| 10,965,812 | B1* | 3/2021 | Das | G06F 40/216 |
| 11,102,622 | B1* | 8/2021 | Haggerty | H04M 3/5238 |
| 2011/0060671 | A1* | 3/2011 | Erbey | G06Q 40/00 |
| | | | | 705/7.42 |
| 2013/0060587 | A1* | 3/2013 | Bayrak | G06Q 10/10 |
| | | | | 705/7.11 |
| 2015/0278709 | A1* | 10/2015 | Zeng | G06N 3/084 |
| | | | | 706/12 |
| 2017/0195488 | A1* | 7/2017 | Pendyala | H04M 3/5166 |
| 2018/0101797 | A1* | 4/2018 | Mueller | G06Q 30/0201 |
| 2019/0043125 | A1* | 2/2019 | Cropper | G06F 40/247 |
| 2022/0207295 | A1* | 6/2022 | Stanevich | G06F 18/2185 |
| 2023/0283716 | A1* | 9/2023 | Oliveira | H04M 3/5158 |

* cited by examiner

*Primary Examiner* — Simon King
(74) *Attorney, Agent, or Firm* — Cynthia S. Lamon; Lamon Patent Services

(57) ABSTRACT

A method for debt collection has functions for dividing a day into specific time windows, analyzing historical call data over a period of time for specific accounts by telephone number, determining right party contact (RPC) percentage over all calls made to the telephone number within each of the specific time windows, determining a specific time window with the highest RPC as a best time to call (BTTC) for each account, utilizing the BTTC in preparing a specific call list for an automatic dialer such that telephone numbers for a specific account are only dialed by the automatic dialer during the specific time window determined to be the BTTC for that telephone number, executing the automatic dialer with the specific call list, and routing calls that are answered to agents for interaction with the persons answering the calls.

12 Claims, 2 Drawing Sheets

BEST TIME TO CALL IN AUTOMATIC DIALING OPERATIONS

BACKGROUND OF THE INVENTION

1. Field of the Invention

The present invention is in the technical field of call center intelligence and pertains particularly to improvements in autodialing to improve collection results.

2. Description of Related Art

Automatic dialing is used extensively in call centers, often for debt collection. The typical operation is that computerized dialing places calls from a list of phone numbers that are those of persons who are customers of a particular company and are in default of payment for a product or a service. The automatic dialer program works such that, when a call is answered by a real person, the call is automatically switched to an agent who is trained to interact with the person who answers the telephone to determine if that person is the debtor, and if so, to try to collect the debt, or a portion of the debt, or to elicit a promise to pay. Results are recorded and fed back to a tracking system.

Conventional dialers for collections calls yield wrong party contact rates as a percentage of connects of 80% of higher, a huge waste of agent's time and resources. But conventional automatic dialers do not have any ability to determine a best time to call the customer or any knowledge of the customer's behavior towards the creditor's collection calls. Accordingly, the dialer often calls delinquent customers at home while they are at work or at work while they are at home or at other inconvenient times. Additionally, the dialer does not know which customers will be receptive to the creditors call and which will ignore the collection call.

What is clearly needed is a system that utilizes historic data of best time to call (BTTC) in managing call lists and calling times for an automatic dialer and may clue agents regarding individual debtor's attitudes and behavior.

BRIEF SUMMARY OF THE INVENTION

In an embodiment of the invention a method for debt collection is provided, comprising dividing a day into specific time windows, analyzing historical call data over a period of time for specific accounts by telephone number, determining right party contact (RPC) percentage over all calls made to the telephone number within each of the specific time windows, determining a specific time window with the highest RPC as a best time to call (BTTC) for each account, utilizing the BTTC in preparing a specific call list for an automatic dialer such that telephone numbers for a specific account are only dialed by the automatic dialer during the specific time window determined to be the BTTC for that telephone number, executing the automatic dialer with the specific call list, and routing calls that are answered to agents for interaction with the persons answering the calls.

In one embodiment the specific time windows are periods of one or more hours. Also, in one embodiment the method further comprises analyzing historical call data over a period of time, segmenting delinquent accounts according to behavior of persons associated with the accounts when receiving calls made by the automatic dialer. In one embodiment segmentation is into a plurality of segments of different difficulty in resolution. And in one embodiment a first segment is No History (NH) accounts, determined by a history of few calls and rapid account resolution, the NH customers considered to be responsible customers, a second segment being Best Time to Call (BTTC) accounts for which a BTTC has been determined, the BTTC customers determined to be medium difficulty, and a third segment designated NB for No BTTC, the NB customers considered to be most difficult in resolution of debt.

In one embodiment of the method analysis of historical call data is utilized in creating training process and material for agents. Also, in one embodiment specific scripts are provided to agents to follow to interact with different accounts by different segments. Also, in one embodiment a conventional behavioral scoring process having categories as low risk (LR), medium risk (MR) and high risk (HR) is modified to include BTTC and categories determined in the BTTC process, and wherein conventional scoring is changed up or down according to BTTC performance.

In one embodiment the method further comprises a step for associating a tag reflecting the behavioral score with numbers to be dialed when preparing the call list and using the tag when a call is answered in the routing step, routing the call to an agent. And in one embodiment the method further comprises a step for checking tags associated with caller number for incoming calls and using the tag in selecting an agent and routing the incoming call to an agent.

DETAILED DESCRIPTION OF THE INVENTION

Figure 1:
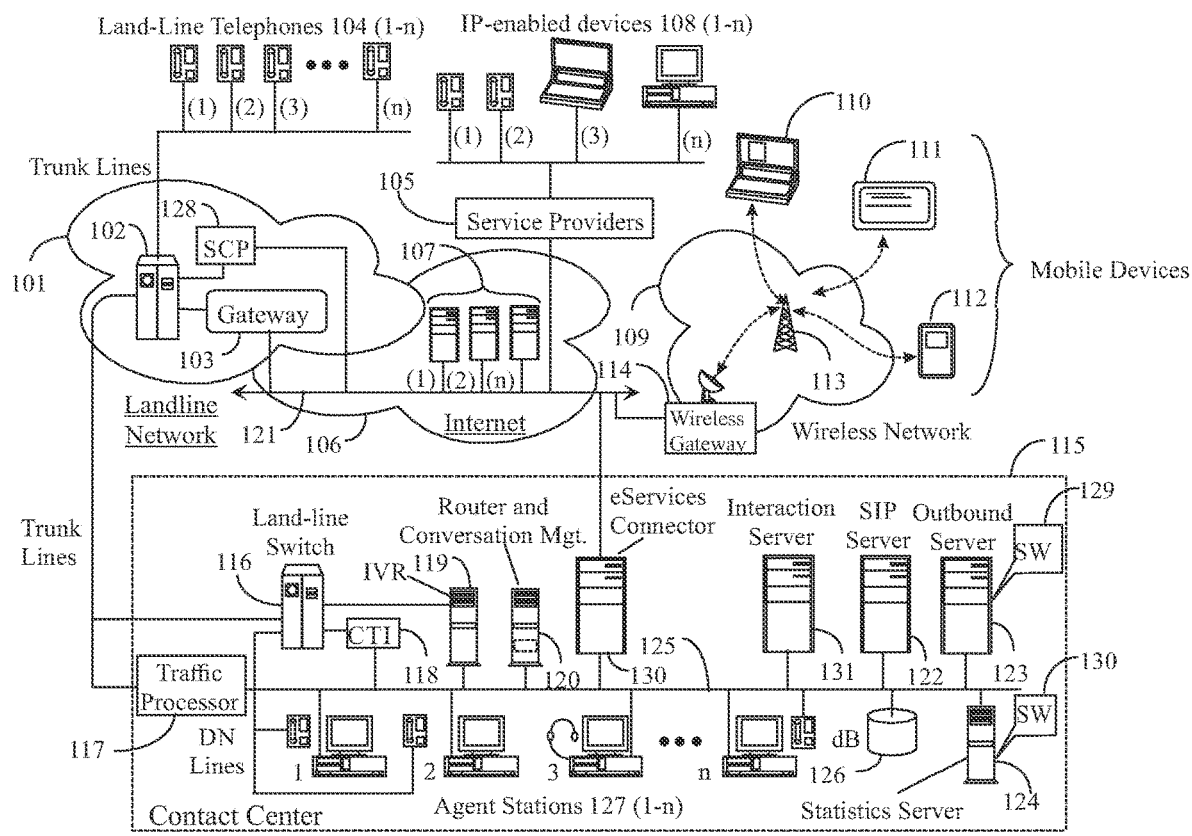
FIG. 1 is an architectural diagram illustrating a communication network, including a call center, in an embodiment of the present invention.

FIG. 1 is a diagram illustrating a call center 115 and a plurality of networks with interconnections whereby customers and remote agents may interact with agents and interactive functionality at the call center. Call center 115 may be hosted by one enterprise or by more than one enterprise, and one enterprise may employ more than one call center. Customers and agents may interact with call center 115 through communication appliances such as land-line telephones 104 (1-*n*), IP-enabled devices 108 (1-*n*), or through mobile appliances 110, 111 or 112. In some circumstances interaction may be limited to voice, but in other circumstances interaction may include text interaction, such as, for example, email, messaging services chat, video interaction, data services, and so on.

Persons interacting through land-line telephones 104 may connect firstly over trunk lines as shown to a network switch 102. Switch 102 may interact with hardware and software of a Service Control Point (SCP) 128, which may execute intelligent operations to determine to connect an incoming call to different ones of available call centers or to route an incoming call directly to an agent in a call center or to an agent operating as a remote agent outside a call center premises. Incoming calls in some circumstances may also be routed through a gateway 103 into the well-known Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at call centers.

A call from a land-line telephone 104 connecting to switch 102 may be routed to call center 115 via trunk lines as shown to either a land-line switch 116 in call center 115 or to a Traffic Processor 117. A call center 115 may operate with just one land-line switch or the traffic processor, but in some circumstances may employ both incoming paths. Traffic processor 117 may provide Session Border Control (SBC) functionality, may operate as a Media Gateway, or as a SoftSwitch.

Persons interacting through IP-enabled devices 108 (1-*n*) may interact through the Internet network via backbone 121, enabled by a variety of service providers 105 which operate to provide Internet service for such devices. Devices 108(1) and 108(2) may be IP-enabled telephones, operating under a protocol such as Session Initiation Protocol (SIP). Appliance 108(3) is illustrated as a lap-top computer, which may be enabled by software for voice communication over packet networks such as the Internet, and may also interact in many other ways, depending on installed and operable software, such as Skype™. Similarly, appliance 108(*n*) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may comprise a substantial variety of Internet-connected servers 107 and IP-enabled devices with Internet access may connect to individual ones of such servers to access services provided. Servers 107 in the Internet may comprise email servers, text messaging servers, social networking servers, Voice over IP servers (VoIP), and many more, many of which users may leverage in interaction with a call center such as call center 115.

Another arrangement by which users and agents may interact with call centers is through mobile devices, illustrated in FIG. 1 by devices 110, 11 and 112. Such devices may include, but are not limited to laptop computers, Pad devices and smart telephones. Such devices are not limited by a land-line connection or by a hard-wired Internet connection as shown for telephones 104 or IP-enabled devices 108 and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, such as devices 110, 111 and 112 may connect to supplemental equipment operable in a moving vehicle. For example, cellular smart-phones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services or may connect through the Internet more directly to a call center such as call center 115, where users may interact as customers or as agents of the call center.

Call center 115, as described above, may represent one of a plurality of federated call centers, a single center hosted by a single enterprise, a single call center operating on behalf of a plurality of host enterprises, or any one of a variety of other arrangements. Architecture of an individual call center 115 may also vary considerably, and not all variations may be illustrated in a single diagram such as FIG. 1, which is exemplary. The architecture and interconnectivity illustrated in FIG. 1 is also exemplary.

Equipment in a call center such as call center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line telephones 104, IP-enabled devices 108 or mobile devices represented by devices 110, 111 or 112. Calls may be queued in any one of a variety of ways before connection to an agent, either locally based or remote from the call center, depending on circumstances.

Incoming land-line calls to switch 116 may also be connected to an IVR server 119, which may serve to ascertain purpose of the caller and other information useful in further routing of the call to final connection. A router and conversation manager server 120 may be leveraged for routing intelligence, of which there may be a great variety, and for association of the instant call with previous calls or future calls that might be made.

Land line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to call center 115 for interaction with agent services such as scripting through an agent desktop application, also used by agents at agent stations 127.

Incoming calls from land-line network 101 may alternatively be connected in call center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to call center 115 through the Internet, arriving in the Call center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more. Interaction Server 131 may leverage services of other servers in the call center, and available remotely as well.

Agent station 127(3) is illustrated as having a connected headset from a computing device, which may execute telephony software to interact with packet-switched calls. Agent station 127(n) is illustrated as having an IP-enabled telephone connected to LAN 125, through which an agent at that station may connect to packet-switched calls. Every agent station may have a computerized appliance executing software to enable the using agent to transact by voice, email, chat, instant messaging, and any other known communication process.

A statistics server 124 is illustrated in call center 115, connected to LAN 125, and may provide a variety of services to agents operating in the call center, and in some circumstances to customers of the call center. Statistics may be used in call center management to vary functionality in routing intelligence, load management, and in many other ways. A database 126 may be provided to archive data and to provide temporary storage for many of the activities in call center 115. An outbound server 123 is illustrated and may be used to manage outbound campaigns in the call center, wherein calls may be made to destinations from a campaign list and answered calls may be connected directly or may be queued to be connected to agents involved in the outbound campaigns.

One embodiment of the present invention is devoted to outbound calling for debt collection, wherein customers of an enterprise that may host call center 115 may be delinquent in payments for products or services, and calls are regularly made to try to collect the delinquent payments. Outbound server 123 executes software 129 which operates to place outbound calls from a prepared list of numbers or addresses of telephones or other communication devices associated with customers who are delinquent for payments. Other software may be executed to prepare and manage lists for the outbound calling.

When a call is answered the software is operable to route the call to an agent for interaction with the person who answers. Over a long period of time results of calling are stored in database 126 and statistics server 124 may create and manage call statistics and provide data to server 123 to manage and update call lists.

In one embodiment of the present invention a system is implemented that uses individual account historical calling results for customers to determine the time periods of the day at which the customers are more likely to answer the home, work, or cell phone. Also, the system in one embodiment uses historical interaction records for individual customers to segment customers by response to collection calls so that the segmentation can be utilized in the future as a measure of collection risk.

Table 1 is an example of statistical right or wrong party result for a customer by time buckets of two-hour intervals.

TABLE 1

| Time Bucket | Calls | Wrong party contact (WPC) | Right party contact (RPC) | RPC % |
|---|---|---|---|---|
| 5 am to <7 am | 20 | 10 | 10 | 50% |
| 7 am to <9 am | 10 | 9 | 1 | 10% |
| 9 am to <11 am | 4 | 4 | 0 | 0% |
| 11 am to <1 pm | 10 | 9 | 1 | 10% |
| 1 pm to <3 pm | 100 | 75 | 20 | 25% |
| 3 pm to <5 pm | 10 | 9 | 1 | 10% |
| 5 pm to <7 pm | 10 | 2 | 8 | 80% |
| 7 pm to <9 pm | 10 | 7 | 3 | 30% |

Data like that in Table 1 may be generated for a customer's cellular phone, home phone and work phone, so that that a BTTC may be generated for each phone number for the customer.

Referring to Table 1 it is seen that a right party contact (RPC) is 80% for the time period from 5 to 7 PM for this customer. It will be apparent that for a large plurality of customers, which may in some instances range into millions, with more than one phone number for each, the determination of BTTC involves considerable calculation, but at speeds of modern computers it is doable and efficient.

In one embodiment of the invention the BTTC results are incorporated in the process of forming calling lists, so customers are called only within the window (bucket) in which that customer is most likely to answer. When making up a calling list to direct an automated dialer, for calls to be made in the window of 5 Am to 7 AM only customer numbers that have a BTTC in this window are included, this is repeated for following widows throughout the day.

In an embodiment of the invention a further analysis is carried out to segment customers by their reaction to creditor collection calls. It may be understood that the number of times a customer is called by the collection system and appears and disappears from the call list has a direct bearing on the customer's behavior when called. For example, a customer who ignores collection calls or never answers is likely to stay on the list and be called many more times and at higher frequency, while a customer who answers and readily pays up will disappear from the calling list unless and until he or she is delinquent again. Using statistics collected and analyzed by statistics server 124 by use of SW 130 accounts may be segmented into different segments by behavior.

NH (No history) accounts: NH accounts are delinquent accounts that have been called less than 30 times (or another variable frequency choice) in the preceding 12 months for all time buckets combined, and that do not have a best time to call at the home, work, or cell numbers, where best time to call is defined as having at least a 10% probability (or another variable choice) of reaching the account holder.

EXAMPLE

TABLE 2

| acct_no | Total_calls | wrong party contact count | right party contact count | right party contact percentage |
|---|---|---|---|---|
| 00000291311624 | 15 | 14 | 1 | 7% |
| 00000295938742 | 15 | 15 | 0 | 0% |
| 00000293803387 | 11 | 10 | 1 | 9% |
| 00000295218977 | 7 | 7 | 0 | 0% |
| 00000295184953 | 7 | 7 | 0 | 0% |

The customers of these accounts are considered to be responsible customers who cure fast and easily with minimal collection effort. This is why there are so few collection calls recorded for these customers.

BTTC (Best time to call) accounts: BTTC accounts are delinquent accounts that have been called in the preceding 12 months with calling history indicating at least a 10% probability (or another variable choice) of reaching the account holder at either the home, work, or cell number.

EXAMPLE

TABLE 3

| acct_no | Total_calls | wrong party contact count | right party contact count | right party contact percentage |
|---|---|---|---|---|
| 00000292560126 | 97 | 83 | 14 | 14% |
| 00000294453697 | 98 | 86 | 12 | 12% |
| 00000293316357 | 96 | 86 | 10 | 10% |
| 00000294106121 | 11 | 5 | 6 | 55% |
| 00000293846801 | 8 | 1 | 7 | 88% |

The customers of these accounts are delinquent customers who at least engage by answering collection calls, but the total calls indicates that they are not entirely responsible in paying or promising to pay as a result of the calls.

NB (No Best time to call) accounts: These are delinquent accounts that have been called 30 (or another variable choice) or more times in the preceding 12 months for all time buckets combined, with calling history indicating a less than 10% (or another variable choice) probability of reaching the account holder at either the home, work, or cell number!

EXAMPLE

TABLE 4

| acct_no | Total_calls | wrong party contact count | right party contact count | right party contact percentage |
|---|---|---|---|---|
| 00000294577573 | 215 | 215 | 0 | 0% |
| 00000292908868 | 209 | 209 | 0 | 0% |
| 00000293391954 | 196 | 196 | 0 | 0% |
| 00000293543806 | 193 | 192 | 1 | 1% |
| 00000293105896 | 157 | 155 | 2 | 1% |

The customers of these accounts are seen to be frequently delinquent customers who are resolute in not engaging with the creditor on collection calls. These may be considered the most difficult for collection.

In one embodiment of the invention all accounts are processed to segment the account by a descriptor of NH, BTTC, or NB. This designation may be associated with each account, such that, when preparing dialing lists for the automated dialer, when and if a customer answers, the agent to whom the call is switched to engage with the customer, will have an indication as to the potential response and level of difficulty to expect. Agents may be trained to engage differently according to the segment of the account.

TABLE 5

| Month | Risk Grouping | BTC Status | Number of accounts | Calls | Calls per account | Number of promises | Promises per account | Promises per call | 30 Day cures |
|---|---|---|---|---|---|---|---|---|---|
| July | LR | BTC | 52,134 | 400,567 | 7.68 | 19,087 | 36.61% | 4.76% | 80.35% |
|  |  | NB | 13,675 | 130,980 | 9.58 | 1,654 | 12.10% | 1.26% | 70.56% |
|  |  | NH | 85,000 | 498,761 | 5.87 | 18,765 | 22.08% | 3.76% | 82.67% |
|  |  |  | 150,809 | 1,030,308 | 7.05 | 39,506 | 28.68% | 3.83% | 80.77% |
|  | MR | BTC | 76,345 | 614,356 | 8.05 | 25,000 | 32.75% | 4.07% | 75.56% |
|  |  | NB | 40,564 | 387,967 | 9.56 | 7,000 | 17.26% | 1.80% | 66.45% |
|  |  | NH | 88,907 | 657,865 | 7.40 | 24,000 | 26.99% | 3.65% | 81.35% |
|  |  |  | 205,816 | 1,660,188 | 8.15 | 56,000 | 28.34% | 3.37% | 76.27% |
|  | HR | BTC | 50,908 | 860,897 | 16.91 | 18,910 | 37.15% | 2.20% | 60.54% |
|  |  | NB | 89,765 | 2,000,000 | 22.28 | 16,444 | 18.32% | 0.82% | 58.34% |

TABLE 5-continued

| Month | Risk Grouping | BTC Status | Number of accounts | Calls | Calls per account | Number of promises | Promises per account | Promises per call | 30 Day cures |
|---|---|---|---|---|---|---|---|---|---|
| | | NH | 47,865 | 876,543 | 18.31 | 9,876 | 20.63% | 1.13% | 63.78% |
| | | | 188,538 | 3,737,440 | 20.11 | 45,230 | 26.70% | 1.21% | 60.32% |

The results over a one-month period of many calls as shown by Table 5 show that "Best time to call status" BTC, NB and NH are strong predictors of cure rates and collection risk, with NH overachieving traditional behavioral risk designations while NB underperforms its risk designation. The analysis looks at low risk accounts (LR), medium risk accounts (MR) and high-risk accounts (HR).

It may be seen that for LR, accounts with a best time to call status of "NH" have the highest cure rate (prevented from becoming 30 days past due). The same is true for MR accounts. However, for all risk levels, accounts with a best time to call status of "NB" have the lowest cure rates.

Improvement opportunities for adding "best time to call status" to behavioral scoring can be seen in the Medium risk (MR) accounts designated as NH having a cure rate higher than those of low-risk accounts (LR) designated as NB. Specifically, this suggests MR accounts that are NH should be low risk, while LR accounts that are NB should be medium risk. Additionally, MR accounts that are NB should be high risk.

Aside from cure rates, analysis shows that NB accounts for all risk levels have the most calls per account (highest collection effort) while also having the lowest promise to pay rates. The Best time to call status of NB for an account represents an additional level of collection risk that is not captured by conventional behavioral scoring models. Data shows an NB status should increase the risk level designation by one level which is significant. The same data shows that an NH status (except for high risk) should decrease the risk level designation by one level. The customer's reaction to a collection call is a significant component or predictor of collection risk among other traditional variables.

The novel qualitative segmentation modifier post behavioral scoring approach simply moves down "NH" accounts to a one level lower in risk level except for high-risk accounts. Specifically, medium risk accounts with "NH" become low risk. Low risk accounts with "NB" move a level higher in risk level becoming medium risk, while medium risk accounts with "NB" become high risk. This approach is sufficient as "best time to call status" becomes a qualitative risk modifier post behavioral scoring. It becomes a modifier to improve behavioral score determined risk classifications.

Another approach is to utilize "best time to call status" directly as a component of behavioral scoring. Behavioral scoring models which typically have variables such as payment history, FICO score, LTV (Loan to value) and others, should also include "Best time to call status" as an explanatory variable to determine behavioral score. This approach improves risk-based collections.

Behavioral models utilizing "Best time to call status" as one of the variables can be built using regression, decision tree or neural network. The novel concept is that Best time to call status is now a variable in determining behavioral score or collection risk.

An example of a behavioral scoring model built with regression analysis:

$$\text{Behavioral Score} = 980 + -20(\text{times late } 30+) + 0.1(\text{BTC}) + 5(\text{NH}) + -60(\text{NBTC}) + -4(\text{LTV}) + 0.2(\text{FICO}) \quad \text{Regression Equation}$$

The customer James Wright has the following individual profile:
Times 30+: 0
Best time to call status=NH
LTV=90%
FICO=800

The score for Mr. Wright would be: $980+(-20)*0+(5)*1-(4)*90+(0.2)800=790$ which would designate Mr. Wright as low risk. Behavioral scoring may be done at the individual account level with automation over an entire portfolio of millions of accounts.

In one embodiment of the invention behavioral scores developed over time, including scores using the BTTC status described herein, may be generalized to a set of tags that are based on the scores. For example, the score for Mr. Wright, as described above may be associated with individual calling numbers in calling lists for individual accounts. In this embodiment if an account has a behavioral score indicating the holder of the account is "low risk" the tag may be 1. An account that has a behavioral score listing the holder as "high risk" may have a tag set at 5. Intermediary scores may equate to tags 2-5 in ascending order. These tags in one embodiment are associated with the phone numbers of the holder of the account, so when a dialing list is prepared or edited, the numbers to be dialed are placed in the list according to BTTC data, but the tag is also associated with the number in the dialing list and stored in the database. The system software, in case of an answered call, is aware of the tag via accessing the database, and the tag is used in routing strategy and response strategy to agents that deal with answered calls.

In this embodiment, if a call dialed with a number associated with a high-risk tag (5) or tag "NB" (no best time to call) is answered, that call is expedited in routing immediately to an agent trained to deal with high-risk account holders. The agent may be cued, for example, to demand more than one payment from the account holder. The tag may also be used in an instance of inbound calls, such that anytime an inbound call is answered and queued to be routed, the tag is checked and used in determining best agents and strategy in response. In this embodiment, the agent may be served with a script that matches the score or tag associated with the caller number when routed. In this manner, the agent may be instructed by the script to make adjustments with the caller, for example, asking for two payments or setting up automated monthly payments.

Collection Strategy

The novel segmentation afforded by this best time to call application via the "Best time to call status" also has value for collection strategy. Specifically, accounts that have a best time to call status of BTC can be called on the dialer as the right party contact rates are adequate. Accounts with a best time to call status of NH or NB don't have a best time to call and they often have wrong party contact rates more than 80%. These NH & NB accounts can be routed off the dialer to other channels like texting or the outbound IVR which requires authentication to engage with an agent, thus filtering out wrong party contacts and saving the agent's time for more productive engagements with right party contacts. This approach has headcount savings for collections.

Another approach, related to the automatic dialer specifically, is to restrict the number of times non-productive accounts (Best time to call status of "NH" and "NB") are called. A program is written to only allow one phone type (for example—cell phone) per day of the week into the daily collections calling list. This reduces waste as calling these accounts yield well over 80% wrong party contacts.

Additionally, Best time to call status identifies NB accounts which are the ones that do not pick up collection calls from creditors and pose additional risk so that these accounts can be tagged or labeled so that when the account holder calls on an inbound call, the call can be prioritized and sent to the front of the queue. Agents may also be given a script to use to coach these customers to pick up creditor collection calls. Agents may also be coached to maximize return on the call, ask for payment rather than promises, and try to collect two payments rather than one.

Additionally, a collection strategy for a called number may include call frequency, which may be adjusted based upon the scores and tags. Collection call channel may also be determined based on the different tags and scores. For example, NH & NB are always picked up by wrong party contacts (wife, son) so no collections are made, yet agents will be paid for their time, hence call frequency may be lowered to just once a day to save money and wasted agent time. Communication channel may be changed as well, in this case, by just texting instead of calling. Frequency of calling is also affected by amount of communication channels available or number of phone numbers used. Basically, the segmentation into scores and tags is utilized for creating and adjusting a collection strategy for each number or communication channel.

Figure 2:
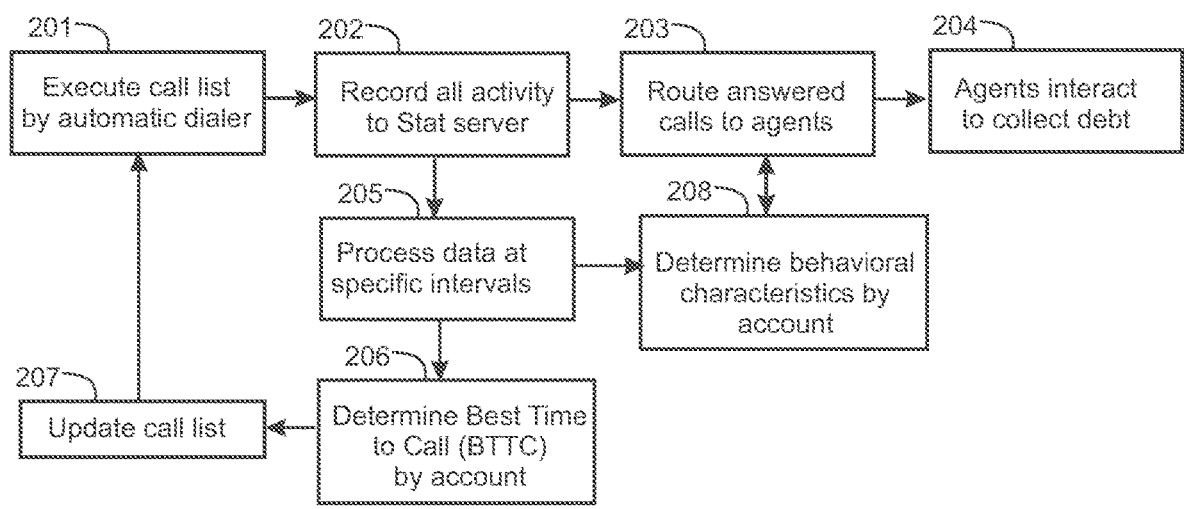
FIG. 2 is a flow diagram illustrating a method in an embodiment of the invention.

FIG. 2 is a flow diagram illustrating a method in an embodiment of the invention. At step 201 a call list is executed by an outbound server such as server 123 of FIG. 1. At step 202 all activity is recorded in a data repository such as repository 126 coupled to a stat server such as server 124 of FIG. 1. At step 203 answered calls are routed to agents who are trained to interact at step 204 with the account holders to try to collect the debts owed to the enterprise.

Returning to step 205 processing of activity data may also be for categorizing accounts (called segmenting above) as to difficulty in collection (see descriptions above re: NH, BTTC and NB accounts). This categorization may be done by the frequency in which an account appears on the call list and the number of times an account has to be called to collect a debt (or not). In one embodiment the behavioral category may be associated with the account so that whenever that account is on the call list, and a call to the account holder is answered, a notification may be made to the agent as to the category. The agents may be guided to use different scripts and approaches with different categories. Alternatively, when a call is routed to an agent at step 203 the system may ping the stat server for the behavioral characteristic.

A person of ordinary skill in the art of debt collection will understand that the embodiments described above are entirely exemplary, and that many alterations might be made in the embodiments within the scope of the invention. The scope is limited only by the claims that follow.

The invention claimed is:

1. A method for debt collection, comprising:
providing a computerized service control point (SCP) executing software providing the method including at least;
dividing a day into specific time windows;
analyzing historical call data over a period of time for specific accounts by telephone number, determining right party contact (RPC) percentage over all calls made to the telephone number within each of the specific time windows;
determining a specific time window with the highest RPC as a best time to call (BTTC) for each account;
utilizing the BTTC in preparing a specific call list for an automatic dialer such that telephone numbers for a specific account are only dialed by the automatic dialer during the specific time window determined to be the BTTC for that telephone number;
executing the automatic dialer to place calls with the specific call list;
analyzing historical call data over a period of time;
segmenting delinquent accounts according to behavior of persons associated with the accounts when receiving calls made by the automatic dialer, the segments including at least No History (NH) accounts, determined by a history of few calls and rapid account resolution, the NH customers considered to be responsible customers, a second segment being accounts for which a BTTC has been determined, the BTTC customers determined to be medium difficulty, and a third segment designated NB for No BTTC, the NB customers considered to be most difficult in resolution of debt; and
routing the calls that are answered to agents for interaction with the persons answering the calls.

2. The method of claim 1 wherein the specific time windows are periods of one or more hours.

3. The method of claim 1 wherein analysis of historical call data is utilized in creating training process and material for agents.

4. The method of claim 1 wherein specific scripts are provided to agents to follow to interact with different accounts by different segments.

5. The method of claim 1 wherein a conventional behavioral scoring process having categories as low risk (LR), medium risk (MR) and high risk (HR) is modified to include BTTC and categories determined in the BTTC process, and wherein conventional scoring is changed up or down according to BTTC performance.

6. The method of claim 5 further comprising a step for associating a tag reflecting the behavioral score with numbers to be dialed when preparing the call list and using the tag when a call is answered in the routing step, routing the call to an agent.

7. The method of claim 6 further comprising a step for checking tags associated with caller number for incoming calls and using the tag in selecting an agent and routing the incoming call to the agent.

8. The method of claim 7, wherein an agent script associated with the tag may be routed to the agent with the call.

9. The method of claim 1, wherein the calls made by the autodialer may be any from a list of communication channels including at least text and email.

10. The method of claim 9, wherein the autodialer increases a frequency of dialing customers with BTTC accounts over customers having the NH and NB accounts.

11. The method of claim 9, wherein the customers with the NH & NB accounts are selected for a communication campaign including any one or more of texting, outbound IVR and emailing channels.

12. The method of claim 11, wherein the customers with the NH & NB accounts are selected when the autodialer is unlikely to achieve 100% completion of the calling list.

* * * * *